United States Patent
Kotra et al.

(10) Patent No.: US 11,102,480 B2
(45) Date of Patent: Aug. 24, 2021

(54) DEVICES AND METHODS FOR IMAGE AND VIDEO CODING

(71) Applicant: Huawei Technologies Co., Ltd., Shenzhen (CN)

(72) Inventors: Anand Meher Kotra, Munich (DE); Zhijie Zhao, Munich (DE); Semih Esenlik, Munich (DE); Han Gao, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/844,740

(22) Filed: Apr. 9, 2020

(65) Prior Publication Data

US 2020/0236351 A1    Jul. 23, 2020

Related U.S. Application Data

(63) Continuation of application No. PCT/EP2017/075706, filed on Oct. 9, 2017.

(51) Int. Cl.
*H04N 19/109* (2014.01)
*H04N 19/176* (2014.01)
*H04N 19/503* (2014.01)
*H04N 19/61* (2014.01)

(52) U.S. Cl.
CPC ......... *H04N 19/109* (2014.11); *H04N 19/176* (2014.11); *H04N 19/503* (2014.11); *H04N 19/61* (2014.11)

(58) Field of Classification Search
CPC .... H04N 19/176; H04N 19/159; H04N 19/11; H04N 19/593; H04N 19/463; H04N 19/105; H04N 19/157; H04N 19/70; H04N 19/91; H04N 19/50; G06T 9/004
See application file for complete search history.

(56) References Cited

U.S. PATENT DOCUMENTS

| | | | |
|---|---|---|---|
| 10,506,228 B2* | 12/2019 | Seregin | H04N 19/157 |
| 10,645,395 B2* | 5/2020 | Yu | H04N 19/126 |
| 10,863,172 B2* | 12/2020 | Yu | H04N 19/176 |
| 2016/0269749 A1 | 9/2016 | Zhang et al. | |

(Continued)

OTHER PUBLICATIONS

Winkelmann, "Intra prediction in HEVC," pp. 1-14 (2012).

(Continued)

*Primary Examiner* — Daniel Chang
(74) *Attorney, Agent, or Firm* — Leydig, Voit & Mayer, Ltd.

(57) ABSTRACT

An apparatus is configured to determine an adopted intra prediction mode on the basis of a most probable modes list, a selected modes list and a non-selected modes list having a first portion and a second portion, wherein the adopted intra prediction mode is one of a plurality of intra prediction modes comprising a plurality of angular intra prediction modes for predicting sample values of a current picture block. The apparatus includes a processor configured to generate the first portion of the non-selected modes list by including one or more angular intra prediction modes determined to be close to a respective angular intra prediction mode of the most probable modes list and the selected modes list. The processor is further configured to determine the adopted intra prediction mode.

15 Claims, 6 Drawing Sheets

| Intra prediction modes | MPM flag | Selected flag | Bit string |
|---|---|---|---|
| MPM modes (6) | 1 | | 0 |
| | | | 10 |
| | | | 110 |
| | | | 1110 |
| | | | 11110 |
| | | | 11111 |
| Selected modes (16) | 0 | 1 | 4 bits fixed length code |
| Non-selected modes (45) | 0 | 0 | Truncated binary code |

(56) References Cited

U.S. PATENT DOCUMENTS

| | | | | |
|---|---|---|---|---|
| 2017/0347103 | A1* | 11/2017 | Yu | H04N 19/1883 |
| 2018/0098064 | A1* | 4/2018 | Seregin | H04N 19/463 |
| 2019/0028702 | A1* | 1/2019 | Yu | H04N 19/13 |
| 2019/0208201 | A1* | 7/2019 | Yasugi | H04N 19/11 |
| 2019/0246108 | A1* | 8/2019 | Aono | H04N 19/157 |
| 2019/0320204 | A1* | 10/2019 | Chiang | H04N 19/176 |
| 2020/0304784 | A1* | 9/2020 | Kotra | H04N 19/176 |

OTHER PUBLICATIONS

Han et al., "Improvements for Intra Prediction Mode Coding," Joint Video Exploration Team (JVET) of ITU-T SG 16 WP 3 and ISO/IEC JTC 1/SC 29/WG 11, 7th Meeting: Torino, IT, No. JVET-G0060, XP030150843, total 4 pages, International Union of Telecommunication, Geneva, Switzerland (Jul. 13-21, 2017).

Seregin et al., "Block shape dependent intra mode coding," Joint Video Exploration Team (JVET) of ITU-T SG 16 WP 3 and ISO/IEC JTC 1/SC 29/WG 11, 4th Meeting: Chengdu, CN, No. JVET-D0114-v3, XP030150362, total 3 pages, International Union of Telecommunication, Geneva, Switzerland (Oct. 15-21, 2016).

"Series H: Audiovisual and Multimedia Systems, Infrastructure of audiovisual services-Coding of moving video, Advanced video coding for generic audiovisual services," ITU-T Telecommunication Standardization Sector of ITU, H.264, total 812 pages, International Union of Telecommunication, Geneva, Switzerland (Apr. 2017).

"Series H: Audiovisual and Multimedia Systems, Infrastructure of audiovisual services-Coding of moving video, High efficiency video coding," ITU-T Telecommunication Standardization Sector of ITU, H.265, total 664 pages, International Union of Telecommunication, Geneva, Switzerland (Dec. 2016).

"Information technology—High efficiency coding and media delivery in heterogeneous environments—Part 2: High efficiency video coding," International Standard ISO/IEC 23008-2:2013, total 13 pages, (Dec. 1, 2013).

Sullivan et al., "Overview of the High Efficiency Video Coding (HEVC) Standard", IEEE Transactions on Circuits and Systems for Video Technology, vol. 22, No. 12, pp. 1649-1668, Institute of Electrical and Electronics Engineers, New York, New York (Dec. 2012).

Seregin et al., "Block shape dependent intra mode coding," Joint Video Exploration Team (JVET) of ITU-T SG 16 WP 3 and ISO/IEC JTC 1/SC 29/WG 11, 7th Meeting: Torino, IT, JVET-G0159, total 3 pages, International Union of Telecommunication, Geneva, Switzerland (Jul. 13-21, 2017).

* cited by examiner

| Intra prediction modes | MPM flag | Selected flag | Bit string |
|---|---|---|---|
| MPM modes (6) | 1 | | 0 |
| | | | 10 |
| | | | 110 |
| | | | 1110 |
| | | | 11110 |
| | | | 11111 |
| Selected modes (16) | 0 | 1 | 4 bits fixed length code |
| Non-selected modes (45) | 0 | 0 | Truncated binary code |

Fig. 6

DEVICES AND METHODS FOR IMAGE AND VIDEO CODING

CROSS-REFERENCE TO RELATED APPLICATIONS

This application is a continuation of International Application No. PCT/EP2017/075706, filed on Oct. 9, 2017. The aforementioned application is hereby incorporated by reference in its entirety.

TECHNICAL FIELD

The disclosure relates to the field of image or video coding. More specifically, the disclosure relates to an apparatus and a method for intra prediction of a picture block as well as an encoding apparatus and a decoding apparatus comprising such an intra prediction apparatus.

BACKGROUND

Digital video communication and storage applications are implemented by a wide range of digital devices, e.g. digital cameras, cellular radio telephones, laptops, broadcasting systems, video teleconferencing systems, etc. One of the most important and challenging tasks of these applications is video compression. The task of video compression is complex and is constrained by two contradicting parameters: compression efficiency and computational complexity. Video coding standards, such as ITU-T H.264/AVC or ITU-T H.265/HEVC, provide a good tradeoff between these parameters. For that reason support of video coding standards is a mandatory requirement for almost any video compression application.

The state-of-the-art video coding standards are based on partitioning of a source picture into picture blocks. Processing of these blocks depend on their size, spatial position and a coding mode specified by an encoder. Coding modes can be classified into two groups according to the type of prediction: intra- and inter-prediction modes. Intra-prediction modes use pixels of the same picture (also referred to as frame or image) to generate reference samples to calculate the prediction values for the pixels of the block being reconstructed. Intra-prediction is also referred to as spatial prediction. Inter-prediction modes are designed for temporal prediction and uses reference samples of previous or next pictures to predict pixels of the block of the current picture. After a prediction stage, transform coding is performed for a prediction error that is the difference between an original signal and its prediction. Then, the transform coefficients and side information are encoded using an entropy coder (e.g., context-adaptive binary arithmetic coding (CABAC) for Advanced Video Coding (AVC)/H.264 and High Efficiency Video Coding (HEVC)/H.265). The recently adopted ITU-T H.265/HEVC standard (ISO/IEC 23008-2:2013, "Information technology—High efficiency coding and media delivery in heterogeneous environments—Part 2: High efficiency video coding", Dec. 2013) declares a set of state-of-the-art video coding tools that provide a reasonable tradeoff between coding efficiency and computational complexity. An overview on the ITU-T H.265/HEVC standard has been given by Gary J. Sullivan, "Overview of the High Efficiency Video Coding (HEVC) Standard", in IEEE Transactions on Circuits and Systems for Video Technology, Vol. 22, No. 12, Dec. 2012, the entire content of which is incorporated herein by reference.

Similarly to the ITU-T H.264/AVC video coding standard, the HEVC/H.265 video coding standard provides for a division of the source picture into picture blocks in the form of so-called coding units (CUs). The term "picture block" in this disclosure is used as a synonym for coding unit or coding block. Each of the CUs can be further split into either smaller CUs or prediction units (PUs). A PU can be intra- or inter-predicted according to the type of processing applied for the pixels of PU. In case of inter-prediction, a PU represents an area of pixels that is processed by motion compensation using a motion vector specified for a PU. For intra prediction, the adjacent pixels of neighbor blocks are used as reference samples to predict a current block. A PU specifies a prediction mode that is selected from the set of intra-prediction modes for all the transform units (TUs) contained in this PU. A TU can have different sizes (e.g., 4×4, 8×8, 16×16 and 32×32 pixels) and can be processed in different ways. For a TU, transform coding is performed, i.e. the prediction error is transformed with a discrete cosine transform or a discrete sine transform (in the HEVC/H.265 standard, it is applied to intra-coded blocks) and quantized. Hence, reconstructed pixels contain quantization noise (it can become apparent, for examples, as blockiness between units, ringing artifacts along with sharp edges, etc.) that in-loop filters such as Deblocking Filter (DBF), Sample Adaptive Offset (SAO) and Adaptive Loop Filter (ALF) try to suppress.

In the H.264/AVC standard, four intra-prediction modes are available for 16×16 blocks for a luma color component. According to the HEVC/H.265 standard, 35 intra prediction modes are available and include a planar mode (the intra-prediction mode index is 0), a DC mode (the intra-prediction mode index is 1), and 33 directional or angular modes (the intra-prediction mode index ranges from 2 to 34).

As of version 1.0 of the JEM software, the set of directional intra-prediction modes has been extended to 65 modes (almost doubled) by decreasing the step angle between the neighboring directional intra-prediction modes by a factor of 2. This increase to 67 intra-prediction modes in total would result in a significant signalling overhead and, thus, reduced coding efficiency since the intra-prediction mode for predicting a picture block is derived at the encoder and needs to be signaled to the decoder. Thus, in order to reduce the signalling overhead the following intra prediction mode coding scheme has been suggested based on a most probable modes (MPM) list (or set) containing 6 of the 67 intra prediction modes, a selected modes list containing 16 of the 67 intra prediction modes and a non-selected modes list containing the remaining 45 intra prediction modes.

The 16 intra prediction modes for the selected mode list are selected from a fixed set of intra prediction modes by ordering the remaining 61 intra prediction modes not included in the most probable modes list on the basis of their respective intra prediction mode index and selecting the following elements therefrom: $\{0, 4, 8, 12, 16, 20, \ldots, 60\}$. The 45 intra prediction modes of the non-selected modes list, in turn, are generated by selecting the following elements from this ranked list of remaining intra-prediction modes: $\{11, 2, 3, 5, 6, 7, 9, 10, \ldots, 59\}$. This can be disadvantageous in certain cases in that the non-selected modes list is fixed and not adaptive with respect to the properties of a currently processed picture block. Moreover, non-selected modes are signalled on the basis of a truncated binary code using 5 bits for the first 19 intra prediction modes of the non-selected modes list and 6 bits for the last 26 intra prediction modes thereof. Thus, in case the intra prediction mode adopted for a currently processed picture block is among the last 26 intra prediction modes of the non-selected modes list, 6 bits are required for signalling the adopted intra prediction mode.

Thus, there is a need for improved devices and methods for video coding, which allow increasing the coding efficiency for intra prediction.

SUMMARY

The present disclosure provides improved devices and methods for video coding, which allow increasing the coding efficiency for intra prediction.

Generally, embodiments of the disclosure are based on the idea to assign the first 19 slots of the non-selected modes list, which are encoded with 5 bits, to more probable intra prediction modes on the basis of information used for constructing and/or contained in the most probable modes list and/or the selected modes list.

More specifically, according to a first aspect, the disclosure relates to an apparatus configured to determine an adopted intra prediction mode on the basis of a most probable modes list of intra prediction modes, a selected modes list of intra prediction modes and a non-selected modes list of intra prediction modes having a first portion (i.e. sub-list) and a second portion (i.e. sub-list), wherein the adopted intra prediction mode is one of a plurality of intra prediction modes comprising a plurality of angular intra prediction modes for predicting sample values of a current picture block. The apparatus comprises a processing unit configured to generate the first portion of the non-selected modes list of intra prediction modes by including one or more angular intra prediction modes determined on the basis of the most probable modes list of intra prediction modes and the selected modes list of intra prediction modes such that the one or more angular intra prediction modes of the first portion of the non-selected modes list of intra prediction modes are close to a respective angular intra prediction mode of the most probable modes list of intra prediction modes and the selected modes list of intra prediction modes. The processing unit is further configured to determine the adopted intra prediction mode, in case the adopted intra prediction mode is part of the first portion of the non-selected modes list of intra prediction modes, using less bits than in case the adopted intra prediction mode is part of the second portion of the non-selected modes list of intra prediction modes.

Thus, by assigning intra prediction modes being close to the intra prediction modes of the most probable modes list and/or the selected modes list to the portion of the non-selected modes list being encoded with less bits the apparatus according to the first aspect can improve the coding efficiency.

In a further possible implementation form of the first aspect, the processing unit is further configured to predict sample values of the current picture block using the adopted intra prediction mode and to provide a predicted picture block.

In a further possible implementation of the first aspect, the plurality of intra prediction modes comprise the plurality of intra prediction modes defined in the HEVC/H.265 standard or a standard evolved therefrom. In an implementation form the most probable modes list comprises 6 different intra prediction modes, the selected modes list comprises 16 different intra prediction modes and the non-selected modes list comprises 45 different intra prediction modes. In an implementation form the adopted intra prediction mode is encoded using a truncated binary code. In an implementation form the first portion of the non-selected modes list comprises 19 different intra prediction modes and the second portion of the non-selected modes list comprises 26 different intra prediction modes.

In a further possible implementation form of the first aspect, the processing unit is configured to generate the first portion of the non-selected modes list by: (i) ranking a plurality of angular intra prediction mode categories according to the number and/or direction of angular intra prediction modes of the most probable modes list and/or the selected modes list falling within each angular intra prediction mode category; and (ii) generating a first portion of the non-selected modes list by including one or more angular intra prediction modes from the highest ranked angular intra prediction mode category in the non-selected modes list.

In a further possible implementation form of the first aspect, the processing unit is further configured to complete the first portion of the non-selected modes list by repeating step (ii) with the second highest ranked angular intra prediction mode category.

In a further possible implementation form of the first aspect, each intra prediction mode is identified by an intra prediction mode index and the processing unit is configured to define the plurality of angular intra prediction mode categories on the basis of the respective angular intra prediction modes associated with a horizontal direction, a vertical direction and one or more diagonal directions, e.g. the respective angular intra prediction modes identified by the intra prediction mode indices 2, 18, 34, 50 and/or 66.

In a further possible implementation form of the first aspect, each intra prediction mode is identified by an intra prediction mode index and the processing unit is configured to generate the first portion of the non-selected modes list by including one or more angular intra prediction modes in the first portion of the non-selected modes list, whose respective intra prediction mode index has an offset of +1, −1, +2, −2, +3 or −3 with respect to an intra prediction mode index of an angular intra prediction mode of the most probable modes list or the selected modes list.

In a further possible implementation form of the first aspect, the processing unit is configured to generate the first portion of the non-selected modes list by including one or more angular intra prediction modes in the first portion of the non-selected modes list on the basis of a processing loop starting with the offset of +1 with respect to an intra prediction mode index of an angular intra prediction mode of the most probable modes list or the selected modes list, which is incremented during each round of the processing loop, or with the offset of −1 with respect to an intra prediction mode index of an angular intra prediction mode of the most probable modes list or the selected modes list, which is decremented during each round of the processing loop.

In a further possible implementation form of the first aspect, the processing unit is configured to repeat the processing loop for an angular intra prediction mode of the most probable modes list having a small most probable modes index more often than the processing loop for an angular intra prediction mode of the most probable modes list having a large most probable modes index.

In an implementation form the most probable modes list comprises a planar intra prediction mode, a DC intra prediction mode, the intra prediction mode adopted for the neighbouring picture block of the current picture block located below and left of the current picture block, the intra prediction mode adopted for the neighbouring picture block of the current picture block located left of the current picture block, the intra prediction mode adopted for the neighbouring picture block of the current picture block located above and left of the current picture block, the intra prediction mode adopted for the neighbouring picture block of the current picture block located above the current picture block and/or the intra prediction mode adopted for the neighbouring picture block of the current picture block located above and right of the current picture block.

In a further possible implementation form of the first aspect, each intra prediction mode is identified by an intra prediction mode index and the processing unit is further configured to generate the selected modes list by including one or more angular intra prediction modes in the selected modes list, whose respective intra prediction mode index has an offset of +2, −2, +4, −4, +6, −6, +8 or −8 (and so on) with respect to an intra prediction mode index of an angular intra prediction mode of the most probable modes list (until the selected modes list is full).

In a further possible implementation form of the first aspect, the processing unit is configured to generate the first portion of the non-selected modes list of intra prediction modes by including one or more angular intra prediction modes in the first portion of the non-selected modes list, whose respective intra prediction mode index has an offset of +2, −2, +4, −4, +6, −6, +8 or −8 (and so on) with respect to an intra prediction mode index of an angular intra prediction mode of the most probable modes list (until the first portion of the non-selected modes list is full).

In a further possible implementation form of the first aspect, the processing unit is further configured to generate the second portion of the non-selected modes list of intra prediction modes by including those intra prediction modes of the plurality of intra prediction modes in the second portion of the non-selected modes list of intra prediction modes that are not part of the most probable modes list, the selected modes list and the first portion of the non-selected modes list.

According to a second aspect, the disclosure relates to an encoding apparatus for encoding a current picture block of a picture, the current picture block comprising a plurality of samples, each sample being associated with a sample value, the encoding apparatus comprising: an intra prediction apparatus according to the first aspect for providing a predicted picture block; and an encoding unit configured to encode the current picture block on the basis of the predicted picture block and the adopted intra prediction mode.

Thus, an improved encoding apparatus for image and video coding is provided, which allows increasing the encoding efficiency for intra prediction.

According to a third aspect, the disclosure relates to a decoding apparatus for decoding an encoded picture block of a picture, the encoded picture block comprising a plurality of samples, each sample being associated with a sample value, the decoding apparatus comprising: an intra prediction apparatus according to the first aspect for providing a predicted picture block; and a restoration unit configured to restore a picture block on the basis of an encoded adopted intra prediction mode, an encoded picture block and the predicted picture block.

Thus, an improved decoding apparatus for image and video coding is provided, which allows increasing the decoding efficiency for intra prediction.

According to a fourth aspect, the disclosure relates to a method of determining an adopted intra prediction mode on the basis of a most probable modes list of intra prediction modes, a selected modes list of intra prediction modes and a non-selected modes list of intra prediction modes having a first portion (i.e. sub-list) and a second portion (i.e. sub-list), wherein the adopted intra prediction mode is one of a plurality of intra prediction modes comprising a plurality of angular intra prediction modes for predicting sample values of a current picture block. The method comprises the steps of: generating the first portion of the non-selected modes list of intra prediction modes by including one or more angular intra prediction modes determined on the basis of the most probable modes list of intra prediction modes and the selected modes list of intra prediction modes such that the one or more angular intra prediction modes of the first portion of the non-selected modes list of intra prediction modes are close to a respective angular intra prediction mode of the most probable modes list of intra prediction modes and the selected modes list of intra prediction modes; and determining the adopted intra prediction mode, in case the adopted intra prediction mode is part of the first portion of the non-selected modes list of intra prediction modes, using less bits than in case the adopted intra prediction mode is part of the second portion of the non-selected modes list of intra prediction modes.

Thus, an improved method for image and video coding is provided, which allows increasing the coding efficiency for intra prediction.

The method according to the fourth aspect can be performed by the apparatus according to the first aspect. Further features of the method according to the fourth aspect result directly from the functionality of the apparatus according to the first aspect and its different implementation forms.

According to a fifth aspect, the disclosure relates to a computer program comprising program code for performing the method according to the fourth aspect when executed on a computer.

The invention can be implemented in hardware and/or software.

BRIEF DESCRIPTION OF THE DRAWINGS

Further embodiments will be described with respect to the following figures, wherein:

FIG. 6 shows a table illustrating different intra prediction mode signaling schemes implemented in an apparatus according to an embodiment.

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which the invention may be placed. It is understood that other aspects may be utilized and structural or logical changes may be made without departing from the scope of the invention. The following detailed description, therefore, is not to be taken in a limiting sense.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
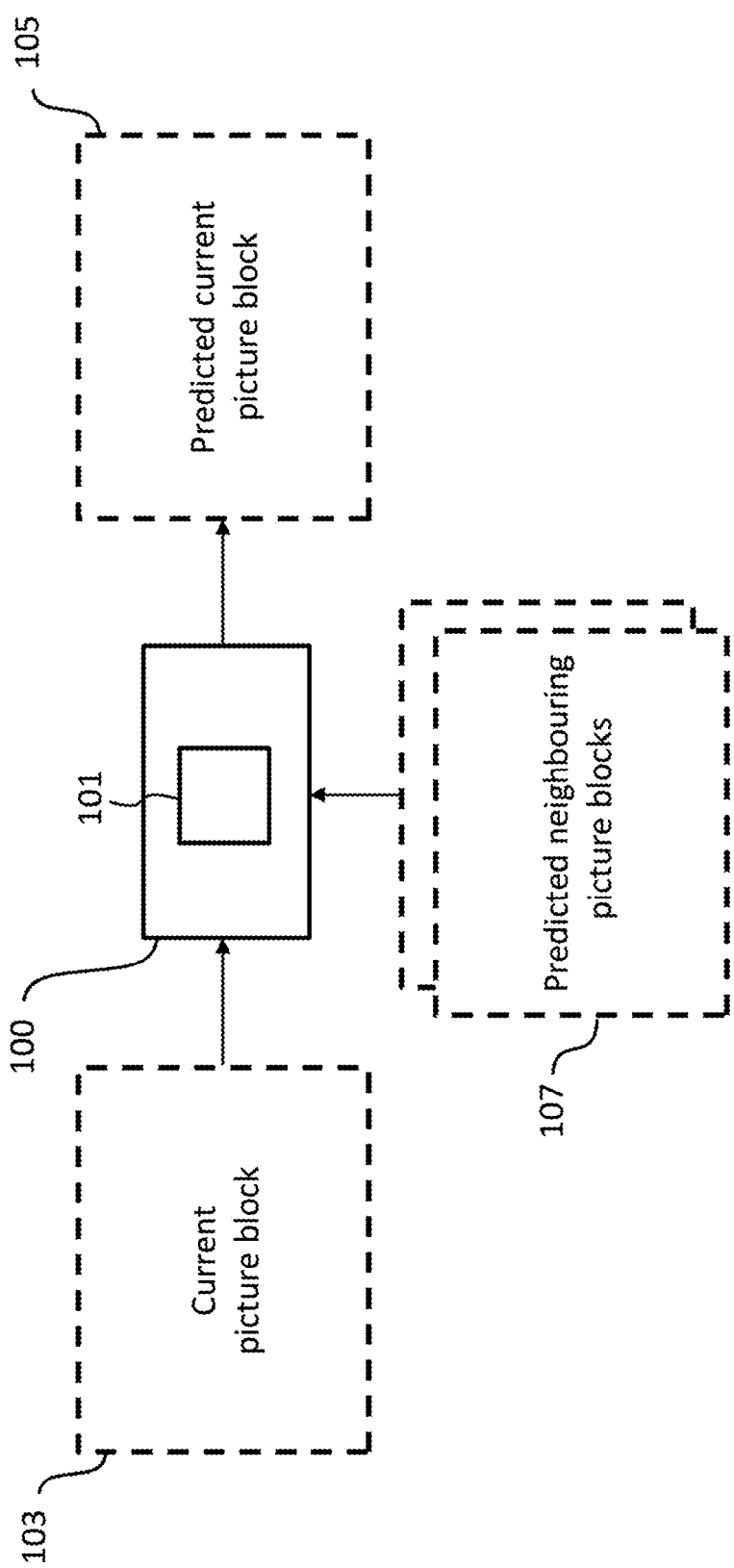
FIG. 1 shows a schematic diagram illustrating an apparatus according to an embodiment.

FIG. 1 shows a schematic diagram illustrating an apparatus 100 according to an embodiment. As will be discussed in more detail in the context of FIGS. 2 and 3 the apparatus 100 is configured to determine an adopted intra prediction mode on the basis of a most probable modes list of intra prediction modes, a selected modes list of intra prediction modes and a non-selected modes list of intra prediction modes. The adopted intra prediction mode is one of a plurality of intra prediction modes comprising a plurality of angular or directional intra prediction modes for predicting sample values of a current picture block 103. In an embodiment, the adopted intra prediction mode can be determined by the apparatus 100 on the basis of a rate distortion criterion.

The apparatus 100 comprises a processing unit 101 configured to generate the first portion or sub-list of the non-selected modes list by including one or more angular intra prediction modes determined on the basis of the most probable modes list and the selected modes list such that the one or more angular intra prediction modes of the first portion of the non-selected modes list are close to a respective angular intra prediction mode of the most probable modes list and the selected modes list. The processing unit 101 is further configured to determine the adopted intra prediction mode, in case the adopted intra prediction mode is part of the first portion of the non-selected modes list, using less bits than in case the adopted intra prediction mode is part of the second portion of the non-selected modes list. The processing unit 101 may be processing circuitry. The processing circuitry may be programmable or non-programmable.

In an embodiment, the processing unit 101 is further configured to generate the second portion of the non-selected modes list by including those intra prediction modes of the plurality of intra prediction modes in the second portion of the non-selected modes list that are not part of the most probable modes list, the selected modes list and the first portion of the non-selected modes list.

In an embodiment, the processing unit 101 is configured to determine the adopted intra prediction mode, in case the adopted intra prediction mode is part of the non-selected modes list using a truncated binary code. In an embodiment, the processing unit 101 is configured to determine the adopted intra prediction mode using m bits, in case the adopted intra prediction mode is part of the first portion of the non-selected modes list, and using m+1 bits, in case the adopted intra prediction mode is part of the second portion of the non-selected modes list.

As illustrated in FIG. 1, in an embodiment, the processing unit 101 can be further configured to predict on the basis of samples values of already predicted neighboring blocks 107 sample values of the current picture block 103 using the adopted intra prediction mode and to provide a predicted picture block 105. In an embodiment, the plurality of intra prediction modes comprises the plurality of intra prediction modes defined in the HEVC/H.265 standard or a standard evolved therefrom. In an embodiment, the most probable modes list comprises 6 different intra prediction modes, the selected modes list comprises 16 different intra prediction modes and the non-selected modes list comprises 45 different intra prediction modes.

Figure 2:
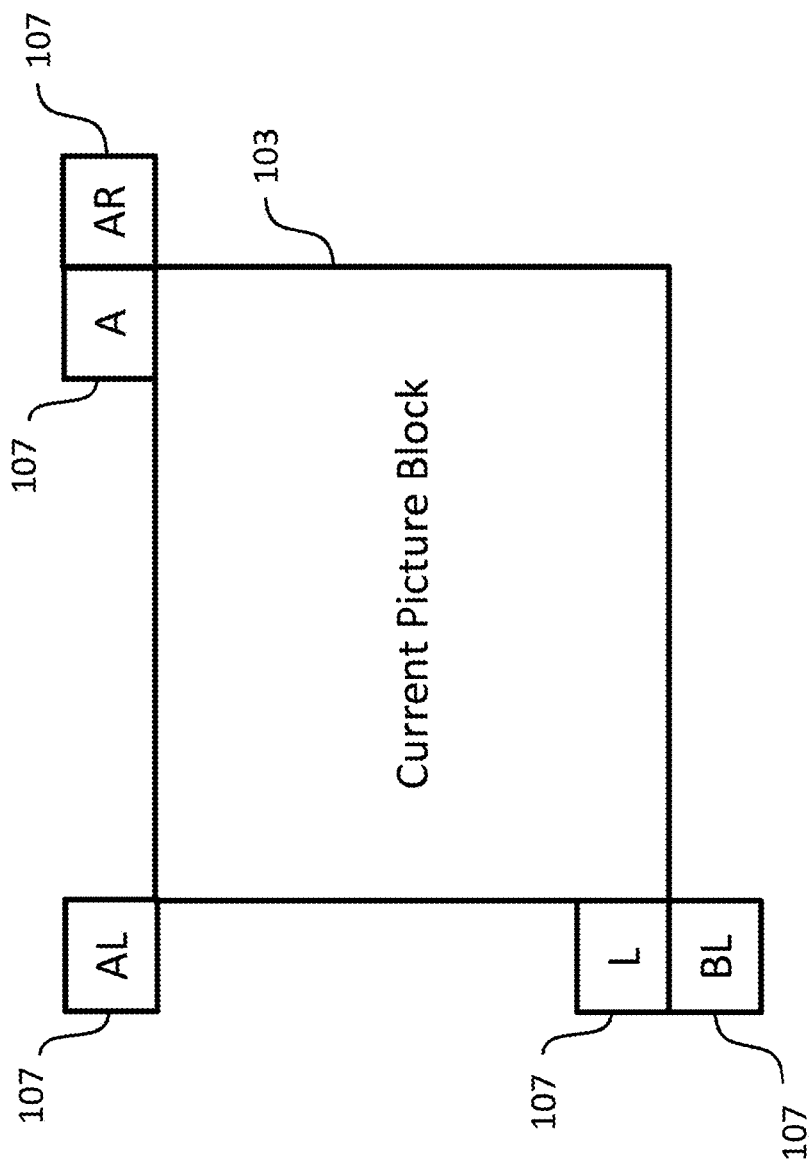
FIG. 2 shows a schematic diagram illustrating the generation of a MPM list implemented in an apparatus according to an embodiment.

FIG. 2 illustrates the current picture block 103 as processed by the processing unit 101 of the apparatus 100 according to an embodiment as well as exemplary neighboring blocks 107. In the exemplary embodiment shown in FIG. 2 these exemplary neighbors 107 of the current picture block comprise the neighboring picture block 107 of the current picture block 103 located below and left of the current picture block 103 (referred to as BL), the neighbouring picture block 107 located left of the current picture block 103 (referred to as L), the neighbouring picture block 107 located above and left of the current picture block 103 (referred to as AL), the neighboring picture block 107 located above the current picture block 103 (referred to as A) and the neighboring picture block 107 located above and right of the current picture block 103 (referred to as AR). In an embodiment, for constructing the most probable modes list the processing unit 101 is configured to include the intra prediction modes adopted for the neighbors 107 of the current picture block 103 shown in FIG. 2 into the most probable modes list.

Figure 3:
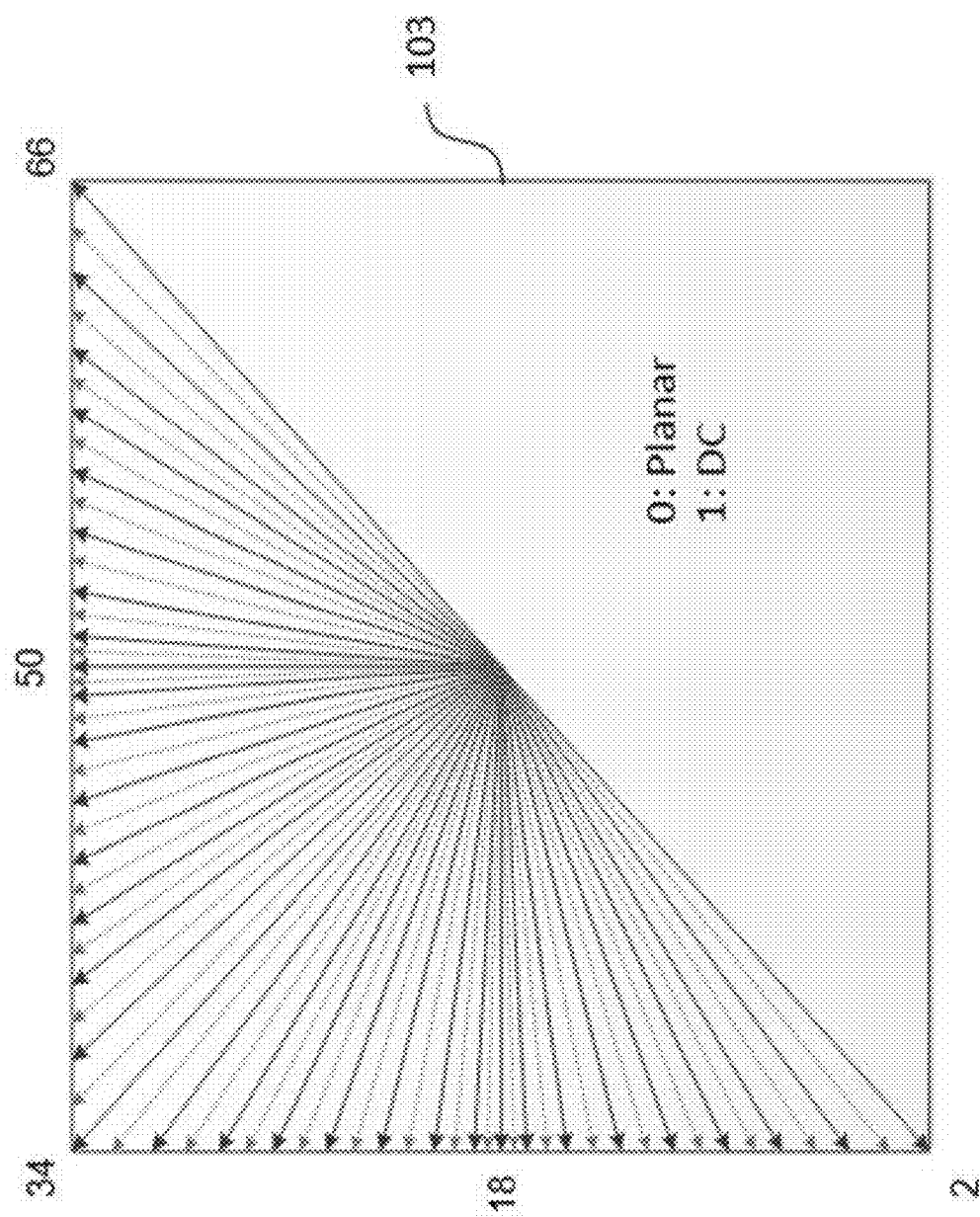
FIG. 3 shows a diagram illustrating a plurality of intra prediction modes implemented in an apparatus according to an embodiment.

In an embodiment, the processing unit 101 of the apparatus 100 is configured to generate the first portion of the non-selected modes list by: (i) ranking a plurality of angular intra prediction mode categories according to the number and/or direction of angular intra prediction modes of the most probable modes list and/or the selected modes list falling within each angular intra prediction mode category; and (ii) generating a first portion of the non-selected modes list by including one or more angular intra prediction modes from the highest ranked angular intra prediction mode category in the non-selected modes list. In an embodiment, step (ii) can be repeated with the second highest ranked angular intra prediction mode category and so on until the first portion of the non-selected modes list is complete. FIG. 3 illustrates an implementation, where the processing unit 101 of the apparatus 100 is configured to define the plurality of angular intra prediction mode categories on the basis of the respective angular intra prediction mode identified by the intra prediction mode index 2, 18, 34, 50 and/or 66, i.e. the directional modes pointing to the bottom left corner (2), horizontally to the left (18), to the top left corner (34), vertically to the top (50) and to the top right corner (66). The angular intra prediction mode category defined, for instance, by the angular intra prediction mode identified by the horizontal intra prediction mode index 18 could comprise the angular intra predictions modes 10 to 26. Similarly, the angular intra prediction mode category defined, for instance, by the vertical angular intra prediction mode identified by the intra prediction mode index 50 could comprise the angular intra predictions modes 42 to 58.

In an embodiment, the processing unit 101 could be configured just to count the number of angular intra prediction modes of the most probable modes list and/or the selected modes list falling within each angular intra prediction mode category and to rank the angular intra prediction mode categories accordingly. Additionally or alternatively, the processing unit 101 can be also configured to take into account the "closeness" of the angular intra prediction modes of the most probable modes list and/or the selected modes list to the central or defining angular intra prediction mode of a respective intra prediction mode category. This can be done, for instance, using a distance measure, such as a squared distance measure.

Figure 4:
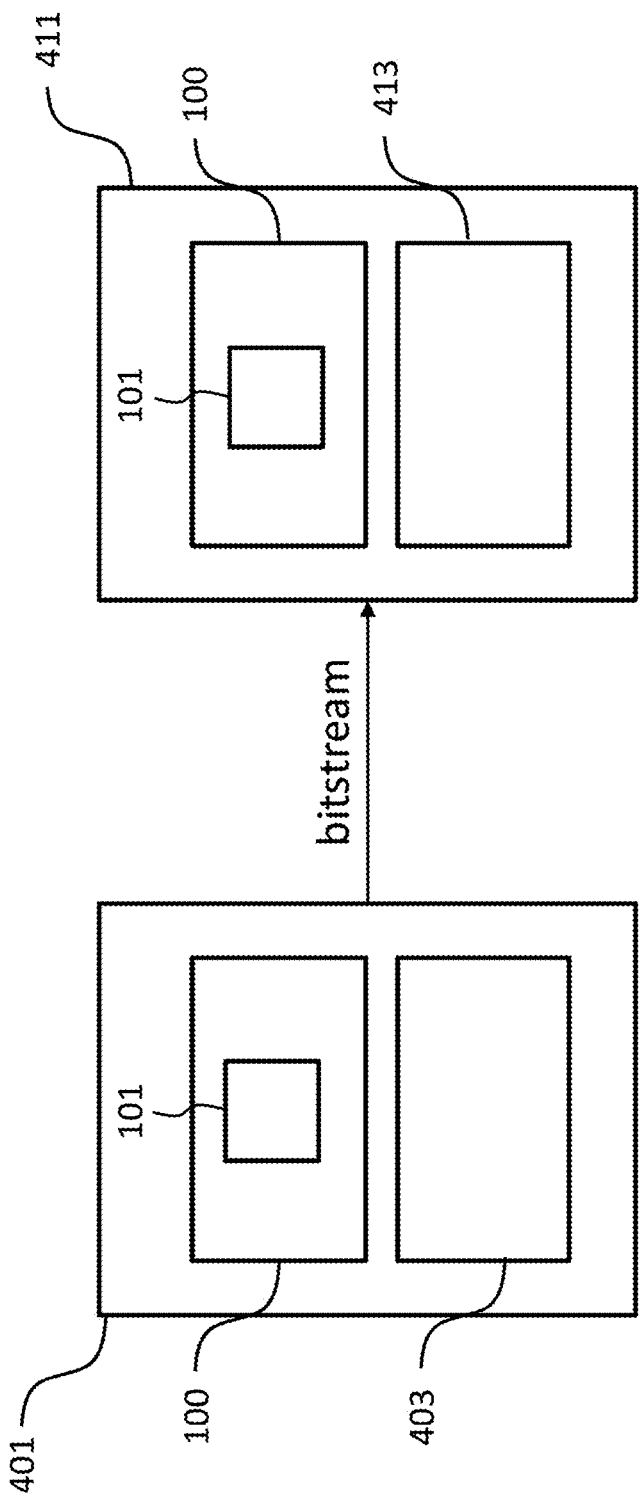
FIG. 4 shows a schematic diagram illustrating an encoding apparatus according to an embodiment and a decoding apparatus according to an embodiment.

FIG. 4 shows a schematic diagram illustrating an encoding apparatus 401 according to an embodiment and a decoding apparatus 411 according to an embodiment.

The encoding apparatus 401 is configured to encode a current picture block 103 of a picture, wherein the current picture block 103 comprises a plurality of samples and each sample is associated with a sample value. The encoding apparatus 401 comprises the apparatus 100 according to an embodiment for providing a predicted picture block 105 and an encoding unit 403 configured to encode the current picture block 103 on the basis of the predicted picture block 105 and the adopted intra prediction mode, for instance, in the form of a bitstream. In an embodiment, the encoding apparatus 201 could be implemented as a hybrid encoder, as defined, for instance, in the HEVC standard, and could comprise further components, such as an entropy encoder.

The decoding apparatus 411 is configured to decode an encoded picture block of a picture, which is contained in the bitstream provided by the encoding apparatus 401, wherein the encoded picture block comprises a plurality of samples and each sample is associated with a sample value. The decoding apparatus 411 comprises the apparatus 100 according to an embodiment for providing a predicted picture block 105 and a restoration unit 413 configured to restore a picture block on the basis of an encoded adopted intra prediction mode, an encoded picture block and the predicted picture block 105. In an embodiment, the decoding apparatus 211 could be implemented as a hybrid decoder, as defined, for instance, in the HEVC standard, and could comprise further components, such as a decoding unit for providing a residual picture block on the basis of the encoded picture block.

Figure 5:
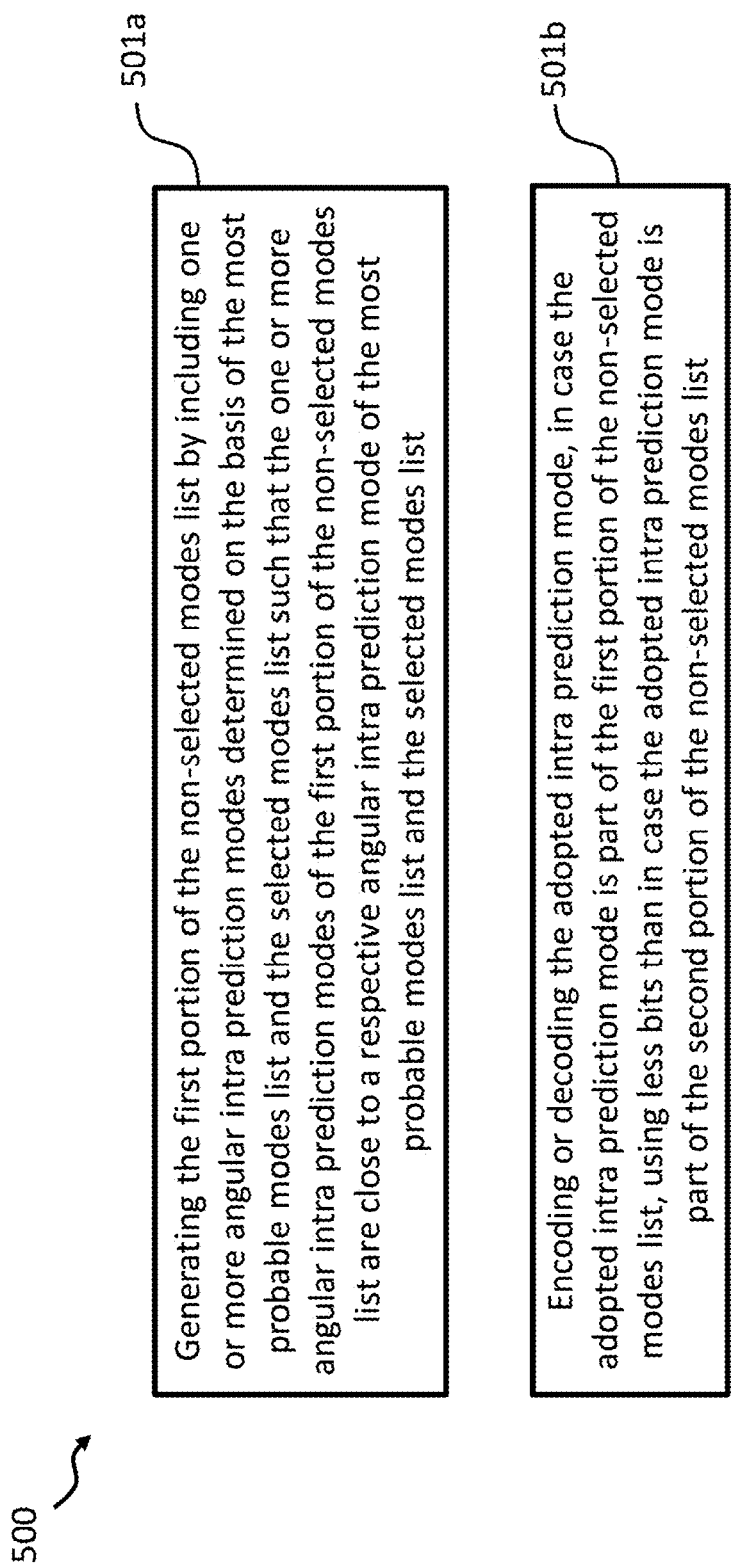
FIG. 5 shows a schematic diagram illustrating a method according to an embodiment.

FIG. 5 illustrates a method 500 for determining an adopted intra prediction mode on the basis of a most probable modes list, a selected modes list and a non-selected modes list having a first portion and a second portion, wherein the adopted intra prediction mode is one of a plurality of intra prediction modes comprising a plurality of angular intra prediction modes for predicting sample values of a current picture block 103. The method 500 comprises the steps of: generating 501a the first portion of the non-selected modes list by including one or more angular intra prediction modes determined on the basis of the most probable modes list and the selected modes list such that the one or more angular intra prediction modes of the first portion of the non-selected modes list are close to a respective angular intra prediction mode of the most probable modes list and the selected modes list; and determining 501b the adopted intra prediction mode, in case the adopted intra prediction mode is part of the first portion of the non-selected modes list, using less bits than in case the adopted intra prediction mode is part of the second portion of the non-selected modes list.

FIG. 6 shows a table illustrating different intra prediction mode signaling schemes implemented in the apparatus 100, the encoding apparatus 401 and/or the decoding apparatus 411 according to an embodiment. As can be taken from the table shown in FIG. 6, according to an embodiment the intra prediction modes of the most probable modes (MPM) list are encoded using an MPM flag (1) and a truncated unary binarization. The intra prediction modes of the selected modes list are encoded using the MPM flag (0), a selected flag (1) and a fixed length code (4 bits in the case of 16 modes). As already mentioned above, in an embodiment the intra prediction modes of the non-selected modes list are encoded using the MPM flag (0), the selected flag (0) and a truncated binary code (5 or 6 bits in the case of 45 modes).

In an embodiment, the processing unit 101 of the apparatus 100 is configured to construct the most probable modes (MPM) list on the basis of intra prediction modes adopted for neighboring picture blocks 107 of the current picture block 103, i.e. adopted for the first tier neighbors 107 of the current picture block 103, in the following way.

In an embodiment, five neighbouring intra prediction modes are used to form the MPM list. Those locations of the 5 neighbouring blocks are the same as those used in the merge mode, i.e., left (L), above (A), below left (BL), above right (AR), and above left (AL) as shown in FIG. 2. An initial MPM list is formed by inserting the 5 neighbour intra prediction modes, the planar mode, and the DC mode into the MPM list. A pruning process can be used to remove any duplicate mode so that only unique modes are included into the MPM list. The order in which the initial modes are included can be left (L), above (A), planar, DC, below left (BL), above right (AR), and above left (AL).

In an embodiment, the processing unit 101 of the apparatus 100 is configured to generate the first portion of the non-selected modes list by including one or more angular intra prediction modes in the first portion of the non-selected modes list, whose respective intra prediction mode index has an offset of +1, −1, +2, −2, +3, −3, . . . with respect to an intra prediction mode index of an angular intra prediction mode of the most probable modes list or the selected modes list. In an embodiment, this can be done using a processing loop with increasing positive offsets and/or decreasing negative offsets.

In an embodiment, each list element of the most probable modes list is identified by a most probable modes index and the processing unit 101 of the apparatus 100 is configured to generate the first portion of the non-selected modes list by including one or more angular intra prediction modes in the first portion of the non-selected modes list, whose respective intra prediction mode index has an offset of +1, −1, +2, −2, +3, −3 . . . with respect to an intra prediction mode index of an angular intra prediction mode of the most probable modes list or the selected modes list. This can be done on the basis of a processing loop starting with the offset of +1 with respect to an intra prediction mode index of an angular intra prediction mode of the most probable modes list or the selected modes list, which is incremented during each round of the processing loop, or with the offset of −1 with respect to an intra prediction mode index of an angular intra prediction mode of the most probable modes list or the selected modes list, which is decremented during each round of the processing loop.

In an embodiment, the processing unit 101 is configured to repeat the processing loop for an angular intra prediction mode of the most probable modes list having a small most probable modes index more often than the processing loop for an angular intra prediction mode of the most probable modes list having a large most probable modes index. For instance, the processing unit 101 can be configured to derive from the first intra prediction mode of the most probable modes list 6 intra predictions modes, from the second intra prediction mode of the most probable modes list 5 intra predictions modes, from the third intra prediction mode of the most probable modes list 4 intra predictions modes, from the fourth intra prediction mode of the most probable modes list 2 intra predictions modes, from the fifth intra prediction mode of the most probable modes list 2 intra predictions modes and from the sixth intra prediction mode of the most probable modes list 1 intra prediction mode using the offsets described above. In case not all of the 19 "slots" of the first portion of the non-selected modes list should be occupied, the processing unit 101 can be further configured to include additional available intra prediction modes from default list, such as {2, 18, 34, 50, 66; 10, 26, 42, 58; 6, 14, 22, 30, 38, 46, 54, 62; 17, 19, 49, 51}.

In an embodiment, the processing unit 101 of the apparatus 100 is further configured to generate the selected modes list by including one or more angular intra prediction modes in the selected modes list, whose respective intra prediction mode index has an offset of +2, −2, +4, −4, +6, −6, +8 or −8 . . . with respect to an intra prediction mode index of an angular intra prediction mode of the most probable modes list. For instance, the processing unit 101 can start with a respective offset of +2 and/or −2 and increment/decrement the respective offset by 2. In an embodiment, this processing loop can be extended to generate the first portion of the non-selected modes list by including one or more angular intra prediction modes in the first portion of the non-selected modes list, whose respective intra prediction mode index has an offset of +2, −2, +4, −4, +6, −6, +8 or −8 . . . with respect to an intra prediction mode index of an angular intra prediction mode of the most probable modes list.

While a particular feature or aspect of the disclosure may have been disclosed with respect to only one of several implementations or embodiments, such a feature or aspect may be combined with one or more further features or aspects of the other implementations or embodiments as may be desired or advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives thereof may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the invention has been described with reference to one or more particular embodiments, those skilled in the art recognize that many changes may be made thereto without departing from the scope of the invention. It is therefore to be understood that within the scope of the appended claims and their equivalents, the invention may be practiced otherwise than as specifically described herein.

What is claimed is:

1. An apparatus configured to determine an adopted intra prediction mode on the basis of a most probable modes list, a selected modes list and a non-selected modes list having a first portion and a second portion, wherein the adopted intra prediction mode is one of a plurality of intra prediction modes comprising a plurality of angular intra prediction modes for predicting sample values of a current picture block, the apparatus comprising:
a processor configured to:
generate the first portion of the non-selected modes list by including one or more angular intra prediction modes determined on the basis of the most probable modes list and the selected modes list, and
determine the adopted intra prediction mode, in case the adopted intra prediction mode is part of the first portion of the non-selected modes list, using less bits than in case the adopted intra prediction mode is part of the second portion of the non-selected modes list,
wherein the processor is configured to generate the first portion of the non-selected modes list by:
(i) ranking a plurality of angular intra prediction mode categories according to a number and/or a direction of angular intra prediction modes of the most probable modes list and/or the selected modes list falling within each angular intra prediction mode category; and
(ii) generating the first portion of the non-selected modes list by including one or more angular intra prediction modes from the highest ranked angular intra prediction mode category in the non-selected modes list.

2. The apparatus of claim 1, wherein the processor is further configured to complete the first portion of the non-selected modes list by repeating step (ii) with the second highest ranked angular intra prediction mode category.

3. The apparatus of claim 1, wherein each intra prediction mode is identified by an intra prediction mode index, and wherein the processor is configured to define the plurality of angular intra prediction mode categories based on respective angular intra prediction modes associated with a horizontal direction, a vertical direction, and one or more diagonal directions.

4. The apparatus of claim 1, wherein each intra prediction mode is identified by an intra prediction mode index, and wherein the processor is configured to generate the first portion of the non-selected modes list by including one or more respective angular intra prediction modes in the first portion of the non-selected modes list, the one or more respective intra prediction mode index of the one or more respective angular intra prediction modes having an offset of +1, −1, +2, −2, +3 or −3 with respect to an intra prediction mode index of an angular intra prediction mode of the most probable modes list or the selected modes list.

5. The apparatus of claim 4, wherein each list element of the most probable modes list is identified by a most probable modes index, and wherein the processor is configured to generate the first portion of the non-selected modes list by including one or more respective angular intra prediction modes in the first portion of the non-selected modes list, the one or more respective intra prediction mode index of the one or more respective angular intra prediction modes having an offset of +1, −1, +2, −2, +3 or −3 with respect to an intra prediction mode index of an angular intra prediction mode of the most probable modes list or the selected modes list.

6. The apparatus of claim 5, wherein the processor is configured to generate the first portion of the non-selected modes list by including one or more angular intra prediction modes in the first portion of the non-selected modes list on the basis of a processing loop starting with the offset of +1 with respect to an intra prediction mode index of an angular intra prediction mode of the most probable modes list or the selected modes list, which is incremented during each round of the processing loop, or with the offset of −1 with respect to an intra prediction mode index of an angular intra prediction mode of the most probable modes list or the selected modes list, which is decremented during each round of the processing loop.

7. The apparatus of claim 6, wherein the processor is configured to repeat the processing loop for a first angular intra prediction mode of the most probable modes list more frequently than the processor is configured to repeat the processing loop for a second angular intra prediction mode of the most probable modes list, the first angular intra prediction mode having a first most probable modes index and the second angular intra prediction mode having a second most probable modes index, the first most probable modes index being smaller than the second most probable modes index.

8. The apparatus of claim 1, wherein each intra prediction mode is identified by an intra prediction mode index and wherein the processor is further configured to generate the selected modes list by including one or more respective angular intra prediction modes in the selected modes list, the one or more respective intra prediction mode index of the one or more respective angular intra prediction modes having an offset of +2, −2, +4, −4, +6, −6, +8 or −8 with respect to an intra prediction mode index of an angular intra prediction mode of the most probable modes list.

9. The apparatus of claim 6, wherein the processor is configured to generate the first portion of the non-selected modes list by including one or more respective angular intra prediction modes in the first portion of the non-selected modes list, the one or more respective intra prediction mode index of the one or more respective angular intra prediction modes having an offset of +2, −2, +4, −4, +6, −6, +8 or −8 with respect to an intra prediction mode index of an angular intra prediction mode of the most probable modes list.

10. The apparatus of claim 1, wherein the processor is further configured to generate the second portion of the non-selected modes list by including those intra prediction modes of the plurality of intra prediction modes in the second portion of the non-selected modes list that are not part of the most probable modes list, the selected modes list and the first portion of the non-selected modes list.

11. The apparatus of claim 1, wherein the processor is further configured to predict sample values of the current picture block using the adopted intra prediction mode and to provide a predicted picture block.

12. An encoding apparatus for encoding a current picture block of a picture, the current picture block comprising a plurality of samples, each sample being associated with a sample value, the encoding apparatus comprising:
the apparatus according to claim 11; and
an encoder configured to encode the current picture block based on the predicted picture block and the adopted intra prediction mode.

13. A decoding apparatus for decoding an encoded picture block of a picture, the encoded picture block comprising a plurality of samples, each sample being associated with a sample value, the decoding apparatus comprising:
the apparatus according to claim 11; and
a decoder configured to restore a picture block based on an encoded adopted intra prediction mode, an encoded picture block, and the predicted picture block.

14. A method for determining an adopted intra prediction mode based on a most probable modes list, a selected modes list, and a non-selected modes list having a first portion and a second portion, wherein the adopted intra prediction mode is one of a plurality of intra prediction modes comprising a plurality of angular intra prediction modes for predicting sample values of a current picture block, the method comprising:
generating the first portion of the non-selected modes list by including one or more angular intra prediction modes determined based in the most probable modes list and the selected modes list; and
determining the adopted intra prediction mode, in case the adopted intra prediction mode is part of the first portion of the non-selected modes list, using less bits than in case the adopted intra prediction mode is part of the second portion of the non-selected modes list,
wherein the generating the first portion of the non-selected modes list includes:
(i) ranking a plurality of angular intra prediction mode categories according to a number and/or a direction of angular intra prediction modes of the most probable modes list and/or the selected modes list falling within each angular intra prediction mode category; and
(ii) generating the first portion of the non-selected modes list by including one or more angular intra prediction modes from the highest ranked angular intra prediction mode category in the non-selected modes list.

15. A computer program product comprising a non-transitory computer readable medium having stored thereon program code that, when executed by a processor, causes the processor to perform the method of claim 14.

* * * * *